United States Patent
Kurokawa et al.

(10) Patent No.: US 12,456,925 B2
(45) Date of Patent: Oct. 28, 2025

(54) VOLTAGE TRANSFORMER

(71) Applicant: Hitachi Astemo, Ltd., Hitachinaka (JP)

(72) Inventors: Kazunari Kurokawa, Hitachinaka (JP); Satoshi Hashino, Hitachinaka (JP); Takuma Kato, Hitachinaka (JP); Koji Ikeda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 309 days.

(21) Appl. No.: 18/269,159

(22) PCT Filed: Dec. 9, 2021

(86) PCT No.: PCT/JP2021/045371
§ 371 (c)(1),
(2) Date: Jun. 22, 2023

(87) PCT Pub. No.: WO2022/138209
PCT Pub. Date: Jun. 30, 2022

(65) Prior Publication Data
US 2024/0162819 A1 May 16, 2024

(30) Foreign Application Priority Data
Dec. 25, 2020 (JP) .................. 2020-216358

(51) Int. Cl.
*H02M 7/5387* (2007.01)
*H02M 1/00* (2006.01)
(Continued)

(52) U.S. Cl.
CPC ....... *H02M 3/1586* (2021.05); *H02M 1/0025* (2021.05); *H02M 1/0058* (2021.05);
(Continued)

(58) Field of Classification Search
CPC ........... H02M 1/4225; H02M 1/53871; H02M 1/53873
See application file for complete search history.

(56) References Cited

U.S. PATENT DOCUMENTS

2019/0366850 A1* 12/2019 Ge ...................... H02M 1/15

FOREIGN PATENT DOCUMENTS

| JP | 2011101554 A | 5/2011 |
| JP | 2013005589 A | 1/2013 |

(Continued)

OTHER PUBLICATIONS

Christian Shamar et al.: "Variable-Frequency Controlled Interleaved Boost Converter", 2020 IEEE Energy Conversion Congress and Exposition (ECCE), Oct. 11, 2020, pp. 601-606, XP033850905, DOI: 10.1109/ ECCE44975. 2020. 9235926 [retrieved on Oct. 21, 2020].

(Continued)

*Primary Examiner* — Gary A Nash
(74) *Attorney, Agent, or Firm* — CANTOR COLBURN LLP

(57) ABSTRACT

A voltage transformer includes a magnetic coupling interleaved chopper circuit and a control unit configured to control the magnetic coupling interleaved chopper circuit. The control unit includes a switching frequency setting unit configured to set a switching frequency of the magnetic coupling interleaved chopper circuit on the basis of a state quantity indicating an operation state of the magnetic coupling interleaved chopper circuit and is configured to generate a voltage-transformation gate signal of the switching frequency set by the switching frequency setting unit and to output the generated voltage-transformation gate signal to the magnetic coupling interleaved chopper circuit.

10 Claims, 6 Drawing Sheets

(51) Int. Cl.
    *H02M 1/14*      (2006.01)
    *H02M 1/42*      (2007.01)
    *H02M 3/158*      (2006.01)

(52) U.S. Cl.
    CPC ........... *H02M 1/0064* (2021.05); *H02M 1/14* (2013.01); *H02M 7/53871* (2013.01); *H02M 1/4225* (2013.01)

(56) References Cited

FOREIGN PATENT DOCUMENTS

| | | | |
|---|---|---|---|
| JP | 2017158373 A | 9/2017 | |
| JP | 2019097287 A | 6/2019 | |

OTHER PUBLICATIONS

EPO Extended European Search Report for corresponding EP Application No. 21910358.7; Issued Oct. 11, 2024.

Yang Qi et al.: "Wide Input Voltage DC Electronic Load Architecture With SiC MOSFETs for High Efficiency Energy Recycling", IEEE Transactions on Power Electronics, IEEE, vol. 35, No. 12 (May 24, 2020), pp. 13053-13067, XP011803006, ISSN: 0885-8993, DOI: 10.1109/TPEL.2020.2996678 [retrieved on Aug. 4, 2020].

International Search Report for International Application No. PCT/JP2021/045371; Date of Mailing, Jan. 11, 2022.

PCT Written Opinion of The International Searching Authority for International Application No. PCT/JP2021/045371; Date of Mailing, Jan. 11, 2022.

* cited by examiner

FIG. 3

| I | V2 | | | | | | | | | | |
|---|---|---|---|---|---|---|---|---|---|---|---|
| | 220 | 250 | 300 | 350 | 400 | 450 | 500 | 550 | 600 | 650 | 700 |
| -200 | 6.0 | 6.0 | 7.0 | 8.0 | 8.0 | 8.0 | 9.0 | 9.0 | 9.0 | 10.0 | 10.0 |
| -190 | 6.0 | 6.0 | 7.0 | 8.0 | 8.0 | 8.0 | 8.0 | 9.0 | 10.0 | 10.0 | 10.0 |
| -180 | 6.0 | 6.0 | 7.0 | 8.0 | 8.0 | 8.0 | 8.0 | 9.0 | 10.0 | 10.0 | 10.0 |
| -170 | 6.0 | 6.0 | 7.0 | 8.0 | 8.0 | 8.0 | 8.0 | 9.0 | 10.0 | 10.0 | 10.0 |
| -160 | 6.0 | 6.0 | 7.0 | 8.0 | 8.0 | 8.0 | 8.0 | 9.0 | 10.0 | 10.0 | 10.0 |
| -150 | 6.0 | 6.0 | 7.0 | 8.0 | 8.0 | 8.0 | 8.0 | 9.0 | 10.0 | 10.0 | 10.0 |
| -140 | 6.0 | 6.0 | 8.0 | 8.0 | 8.0 | 8.0 | 8.0 | 9.0 | 10.0 | 10.0 | 10.0 |
| -130 | 6.0 | 6.0 | 8.0 | 8.0 | 8.0 | 8.0 | 9.0 | 9.0 | 10.0 | 10.0 | 10.0 |
| -120 | 6.0 | 6.0 | 8.0 | 8.0 | 8.0 | 8.0 | 9.0 | 9.0 | 10.0 | 10.0 | 10.0 |
| -110 | 6.0 | 6.0 | 8.0 | 8.0 | 8.0 | 8.0 | 9.0 | 9.0 | 10.0 | 10.0 | 10.0 |
| -100 | 6.0 | 6.0 | 8.0 | 8.0 | 8.0 | 8.0 | 9.0 | 9.0 | 10.0 | 10.0 | 10.0 |
| -90 | 6.0 | 6.0 | 8.0 | 8.0 | 8.0 | 8.0 | 9.0 | 9.0 | 10.0 | 10.0 | 12.0 |
| -80 | 6.0 | 6.0 | 8.0 | 9.0 | 8.0 | 8.0 | 9.0 | 9.0 | 10.0 | 10.0 | 12.0 |
| -70 | 6.0 | 6.0 | 9.0 | 9.0 | 8.0 | 8.0 | 9.0 | 9.0 | 10.0 | 10.0 | 12.0 |
| -60 | 6.0 | 6.0 | 9.0 | 9.0 | 9.0 | 8.0 | 9.0 | 9.0 | 12.0 | 12.0 | 12.0 |
| -50 | 6.0 | 6.0 | 11.0 | 11.0 | 9.0 | 8.0 | 8.0 | 9.0 | 12.0 | 12.0 | 12.0 |
| -40 | 6.0 | 8.0 | 11.0 | 11.0 | 9.0 | 8.0 | 10.0 | 12.0 | 12.0 | 12.0 | 12.0 |
| -30 | 6.0 | 8.0 | 12.0 | 12.0 | 11.0 | 9.0 | 12.0 | 12.0 | 12.0 | 12.0 | 12.0 |
| -20 | 6.0 | 9.0 | 12.0 | 12.0 | 12.0 | 12.0 | 12.0 | 12.0 | 12.0 | 12.0 | 12.0 |
| -10 | 9.0 | 11.0 | 12.0 | 12.0 | 12.0 | 12.0 | 12.0 | 12.0 | 12.0 | 12.0 | 12.0 |
| 0 | 11.0 | 11.0 | 12.0 | 12.0 | 12.0 | 12.0 | 12.0 | 12.0 | 12.0 | 12.0 | 12.0 |
| 10 | 11.0 | 11.0 | 12.0 | 12.0 | 12.0 | 12.0 | 12.0 | 12.0 | 12.0 | 12.0 | 12.0 |
| 20 | 8.0 | 10.0 | 12.0 | 12.0 | 12.0 | 11.0 | 12.0 | 12.0 | 12.0 | 12.0 | 12.0 |
| 30 | 8.0 | 10.0 | 11.0 | 11.0 | 11.0 | 11.0 | 12.0 | 12.0 | 12.0 | 12.0 | 12.0 |
| 40 | 6.0 | 8.0 | 11.0 | 11.0 | 9.0 | 9.0 | 11.0 | 12.0 | 12.0 | 12.0 | 12.0 |
| 50 | 6.0 | 8.0 | 11.0 | 11.0 | 9.0 | 9.0 | 9.0 | 12.0 | 11.0 | 12.0 | 12.0 |
| 60 | 6.0 | 6.0 | 11.0 | 9.0 | 8.0 | 8.0 | 9.0 | 12.0 | 10.0 | 12.0 | 12.0 |
| 70 | 6.0 | 6.0 | 10.0 | 9.0 | 8.0 | 8.0 | 9.0 | 12.0 | 10.0 | 12.0 | 12.0 |
| 80 | 6.0 | 6.0 | 8.0 | 9.0 | 8.0 | 8.0 | 9.0 | 11.0 | 10.0 | 12.0 | 12.0 |
| 90 | 6.0 | 6.0 | 8.0 | 8.0 | 8.0 | 8.0 | 9.0 | 9.0 | 10.0 | 10.0 | 12.0 |
| 100 | 6.0 | 6.0 | 8.0 | 8.0 | 8.0 | 8.0 | 9.0 | 9.0 | 10.0 | 10.0 | 12.0 |
| 110 | 6.0 | 6.0 | 8.0 | 8.0 | 8.0 | 8.0 | 9.0 | 9.0 | 10.0 | 10.0 | 12.0 |
| 120 | 6.0 | 6.0 | 8.0 | 8.0 | 8.0 | 8.0 | 9.0 | 9.0 | 10.0 | 10.0 | 11.0 |
| 130 | 6.0 | 6.0 | 8.0 | 8.0 | 8.0 | 8.0 | 9.0 | 9.0 | 10.0 | 10.0 | 11.0 |
| 140 | 6.0 | 6.0 | 8.0 | 8.0 | 8.0 | 8.0 | 9.0 | 9.0 | 10.0 | 10.0 | 11.0 |
| 150 | 6.0 | 6.0 | 8.0 | 8.0 | 8.0 | 8.0 | 9.0 | 9.0 | 10.0 | 10.0 | 11.0 |
| 160 | 6.0 | 6.0 | 8.0 | 8.0 | 8.0 | 8.0 | 9.0 | 9.0 | 10.0 | 10.0 | 11.0 |
| 170 | 6.0 | 6.0 | 8.0 | 8.0 | 8.0 | 8.0 | 9.0 | 9.0 | 10.0 | 10.0 | 11.0 |
| 180 | 6.0 | 6.0 | 7.0 | 8.0 | 8.0 | 8.0 | 9.0 | 9.0 | 10.0 | 10.0 | 11.0 |
| 190 | 6.0 | 6.0 | 7.0 | 8.0 | 8.0 | 8.0 | 9.0 | 9.0 | 10.0 | 10.0 | 11.0 |
| 200 | 6.0 | 6.0 | 7.0 | 8.0 | 8.0 | 8.0 | 9.0 | 9.0 | 10.0 | 10.0 | 11.0 |

VOLTAGE TRANSFORMER

CROSS REFERENCE TO RELATED APPLICATIONS

This is the U.S. national stage of application No. PCT/JP2021/045371, filed on Dec. 9, 2021. Priority under 35 U.S.C. § 119(a) and 35 U.S.C. § 365(b) is claimed from Japanese Application No. 2020-216358, filed Dec. 25, 2020, the disclosure of which is also incorporated herein by reference.

TECHNICAL FIELD

The present invention relates to a voltage transformer.
Priority is claimed on Japanese Patent Application No. 2020-216358, filed Dec. 25, 2020, the content of which is incorporated herein by reference.

BACKGROUND ART

Patent Document 1 discloses a DC/DC converter. The DC/DC converter includes a DC voltage source, a first inductor of which one end is connected to a positive electrode of the DC voltage source, a second inductor of which one end is connected to the positive electrode of the DC voltage source and which is connected in parallel to the first inductor, a capacitor that is connected between the other end of the first inductor and the other end of the second inductor, a first diode of which an anode terminal is connected to a common connection point between the first inductor and the capacitor, a diode of which an anode terminal is connected to a common connection point between the second inductor and the capacitor, a first switching device that is connected between the common connection point between the second inductor and the capacitor and a negative electrode of the DC voltage source, a second switching device that is connected between the common connection point between the capacitor and the first diode and the negative electrode of the DC voltage source, and an output capacitor that is connected to cathode terminals of the first and second diodes, and employs a coupled inductor that is coupled in a direction in which a DC magnetic flux crossing the first inductor and the second inductor is cancelled out.

CITATION LIST

Patent Document

Patent Document 1
Japanese Unexamined Patent Application, First Publication No. 2019-097287

SUMMARY OF INVENTION

Technical Problem

The DC/DC converter is called a magnetic coupling interleaved chopper circuit and decreases a ripple current flowing in the input/output capacitors and reactor by switching the first switching device and the second switching device with phases which are different by 180°.

In the DC/DC converter, a capacitor is provided between the other end of the first inductor and the other end of the second inductor for the purpose of a decrease of switching losses of the first switching device and the second switching device and a surge voltage. That is, the DC/DC converter pays attention to the switching losses of the first switching device and the second switching device as a circuit loss.

However, the first switching device and the second switching device in the DC/DC converter perform a switching operation in a switching frequency which is preset to a fixed value. Accordingly, there is a likelihood that the switching loss will not be able to be decreased satisfactorily depending on an operation state of the DC/DC converter. That is, when the switching frequency of the magnetic coupling interleaved chopper circuit is set to a fixed value, there is a likelihood that performance such as a circuit loss will not be improved.

The present invention was made in consideration of the aforementioned circumstances and an objective thereof is to provide a voltage transformer that can more reliably improve performance of a magnetic coupling interleaved chopper circuit according to an operation state.

Solution to Problem

According to a first aspect of the present invention, there is provided a voltage transformer including: a magnetic coupling interleaved chopper circuit; and a control unit configured to control the magnetic coupling interleaved chopper circuit, wherein the control unit includes a switching frequency setting unit configured to set a switching frequency of the magnetic coupling interleaved chopper circuit on the basis of a state quantity indicating an operation state of the magnetic coupling interleaved chopper circuit and is configured to generate a voltage-transformation gate signal of the switching frequency set by the switching frequency setting unit and to output the generated voltage-transformation gate signal to the magnetic coupling interleaved chopper circuit.

In a second aspect of the present invention, in the voltage transformer according to the first aspect, the switching frequency setting unit sets the switching frequency such that a circuit loss of the magnetic coupling interleaved chopper circuit is minimized.

In a third aspect of the present invention, in the voltage transformer according to the second aspect, the switching frequency setting unit sets the switching frequency in the operation state in which a step-up ratio of the magnetic coupling interleaved chopper circuit doubles to be lower than the switching frequency in the operation state before or after the step-up ratio of the magnetic coupling interleaved chopper circuit doubles.

In a fourth aspect of the present invention, in the voltage transformer according to any one of the first to third aspects, the state quantity includes a reactor current flowing in the magnetic coupling interleaved chopper circuit, and the switching frequency setting unit increases the switching frequency when the reactor current has an abnormal value.

In a fifth aspect of the present invention, in the voltage transformer according to any one of the first to fourth aspects, the switching frequency setting unit includes a frequency map in which a plurality of frequency values corresponding to the state quantity are registered as the switching frequency and generates the voltage-transformation gate signal by searching the frequency map on the basis of the state quantity.

Advantageous Effects of Invention

According to the present invention, it is possible to provide a voltage transformer that can more reliably improve performance of a magnetic coupling interleaved chopper circuit according to an operation state.

BRIEF DESCRIPTION OF DRAWINGS

FIG. 3 is a diagram schematically illustrating a configuration of a carrier frequency map according to the embodiment of the present invention.

DESCRIPTION OF EMBODIMENTS

Hereinafter, an embodiment of the present invention will be described with reference to the accompanying drawings.

Figure 1:
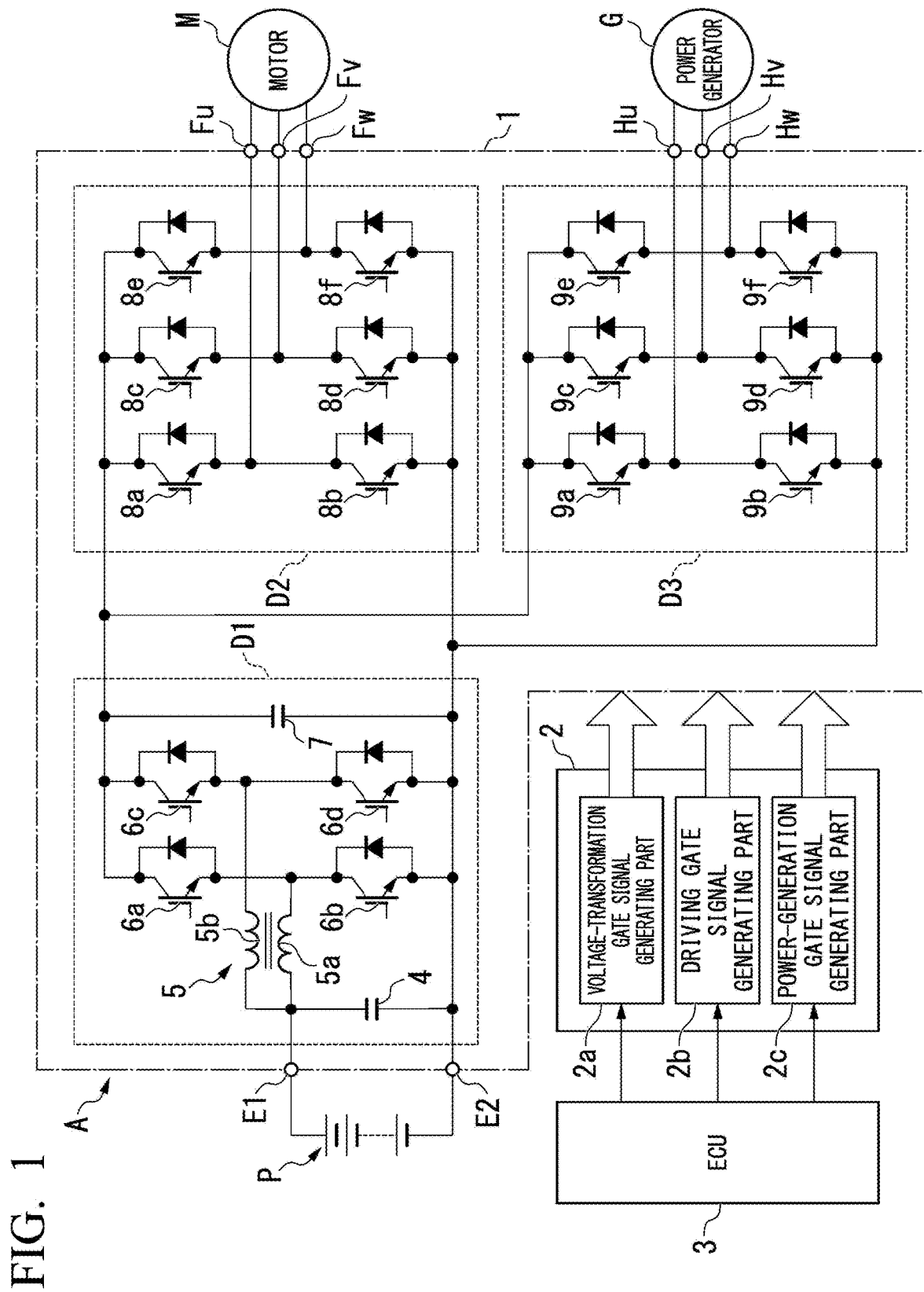
FIG. 1 is a circuit diagram illustrating the entire configuration of a control device A according to an embodiment of the present invention.

A control device A according to an embodiment includes a power control unit (PCU) 1, a gate driver 2, and an electronic control unit (ECU) 3 as illustrated in FIG. 1.

As illustrated in the drawing, the PCU 1 includes three power conversion circuits, that is, a step-up/down converter D1, a driving inverter D2, and a power-generation inverter D3. As illustrated in the drawing, the gate driver 2 includes three voltage-transformation gate signal generating parts, that is, a voltage-transformation gate signal generating part 2a, a driving gate signal generating part 2b, and a power-generation gate signal generating part 2c.

The step-up/down converter D1 of the PCU 1 includes a first capacitor 4, a transformer 5, four voltage-transformation insulated gate bipolar transistors (IGBT) 6a to 6d, and a second capacitor 7. Similarly, the driving inverter D2 of the PCU 1 includes six driving IGBTs 8a to 8f, and the power-generation inverter D3 includes six power-generation IGBTs 9a to 9f The step-up/down converter D1 is an element corresponding to a magnetic coupling interleaved chopper circuit according to the present invention.

As illustrated in the drawing, a battery P, a three-phase motor M (an electric motor), and a power generator G are connected to the control device A. That is, the control device A includes a pair of battery terminals E1 and E2 to which a battery P is connected, three motor terminals Fu, Fv, and Fw to which the three-phase motor M is connected, and three power-generator terminals Hu, Hv, and Hw to which the power generator G is connected as external connection terminals.

The control device A is an electrical device that is provided in an electric vehicle such as a hybrid electric vehicle or a battery electric vehicle, controls the three-phase motor M which is an electric rotary machine, and controls charging of the battery P with AC electric power generated from the power generator G. That is, the control device A performs driving control of the three-phase motor M based on an output of the battery P (battery electric power) and charging control of the battery P based on output electric power of the power generator G (generated electric power).

In the battery P, as illustrated in the drawing, a plus electrode is connected to the plus battery terminal E1 and a minus electrode is connected to the minus battery terminal E2. The battery P is a secondary battery such as a lithium-ion battery and performs discharging of DC electric power for the control device A and charging with DC electric power via the control device A.

The three-phase motor M is a three-phase electric motor of which the number of phases is "3" and is a load of the driving inverter D2. In the three-phase motor M, a U-phase input terminal is connected to the U-phase motor terminal Fu, a V-phase input terminal is connected to a V-phase motor terminal Fv, and a W-phase input terminal is connected to a W-phase motor terminal Fw. A rotation shaft (a drive shaft) of the three-phase motor M is connected to wheels of an electric vehicle and rotationally drives the wheels by applying a rotary power to the wheels.

The power generator G is a three-phase power generator, a U-phase output terminal is connected to a U-phase power-generator terminal Hu, a V-phase output terminal is connected to a V-phase power-generator terminal Hv, and a W-phase output terminal is connected to a W-phase power-generator terminal Hw. The power generator G is connected to an output shaft of a power source such as an engine mounted in the electric vehicle and outputs three-phase AC electric power to the control device A.

The step-up/down converter D1 is a power circuit called a magnetic coupling interleaved chopper circuit. The step-up/down converter D1 alternatively performs a step-up operation of stepping up DC electric power input from the battery P via the pair of battery terminals E1 and E2 and outputting the stepped-up DC electric power to the driving inverter D2 and a step-down operation of stepping down DC electric power input from the driving inverter D2 or the power-generation inverter D3 and outputting the stepped-down DC electric power to the battery P via the pair of battery terminals E1 and E2. That is, the step-up/down converter D1 is a power conversion circuit for inputting and outputting DC electric power with respect to the battery P, the driving inverter D2, or the power-generation inverter D3 in two directions.

The driving inverter D2 includes three (a plurality of) switching legs (a U-phase driving switching leg, a V-phase driving switching leg, and a W-phase driving switching leg) that are provided to correspond to the number of phases of the three-phase motor M (an electric motor). The driving inverter D2 is a power conversion circuit that alternatively performs a powering operation and a regenerating operation.

That is, the driving inverter D2 alternatively performs a powering operation of converting DC electric power input from the step-up/down converter D1 to three-phase AC electric power and outputting the three-phase AC electric power to the three-phase motor M via three motor terminals Fu, Fv, and Fw and a regenerating operation of converting three-phase AC electric power input from the three-phase motor M via the three motor terminals Fu, Fv, and Fw to DC electric power and outputting the DC electric power to the step-up/down converter D1. The driving inverter D2 is a power circuit that mutually converts DC electric power and three-phase AC electric power between the step-up/down converter D1 and the three-phase motor M.

The power-generation inverter D3 is a power conversion circuit that converts three-phase AC electric power input from the power generator G via three power-generator terminals Hu, Hv, and Hw to DC electric power and outputs the DC electric power to the step-up/down converter D1. That is, the power-generation inverter D3 is a power circuit that mutually converts DC electric power and three-phase AC electric power between the step-up/down converter D1 and the power generator G.

The configurations of the step-up/down converter D1, the driving inverter D2, and the power-generation inverter D3 of the PCU 1 will be described below in more detail. First, in the step-up/down converter D1, one end of the first capacitor 4 is connected to the first DC input/output terminal E1 and the transformer 5, and the other end is connected to the second DC input/output terminal E2. The two ends of the first capacitor 4 are primary-side input/output terminals of the step-up/down converter D1.

That is, the first capacitor 4 is connected in parallel to the battery P and removes high-frequency noise which may be included in DC electric power (battery electric power) input from the battery P to the step-up/down converter D1. The first capacitor 4 smooths ripples which may be included in DC electric power (charging electric power) input from the transformer 5.

The transformer 5 includes a primary winding 5a and a secondary winding 5b, one end of the primary winding 5a and one end of the secondary winding 5b are connected to the first DC input/output terminal E1 and one end of the first capacitor 4. The other end of the primary winding 5a is connected to an emitter terminal of the first voltage-transformation IGBT 6a and a collector terminal of the second voltage-transformation IGBT 6b, and the other end of the secondary winding 5b is connected to an emitter terminal of the third voltage-transformation IGBT 6c and a collector terminal of the fourth voltage-transformation IGBT 6d.

In the transformer 5, the primary winding 5a and the secondary winding 5b are electromagnetically coupled with a predetermined coupling coefficient k. That is, the primary winding 5a has a predetermined first self-inductance La corresponding to its own number of turns or the like, and the secondary winding 5b has a predetermined second self-inductance Lb corresponding to its own number of turns or the like. The primary winding 5a and the secondary winding 5b have a mutual inductance M based on the first self-inductance La, the second self-inductance Lb, and the coupling coefficient k.

Out of four voltage-transformation IGBTs 6a to 6d, the first voltage-transformation IGBT 6a and the second voltage-transformation IGBT 6b constitute an A-phase voltage-transformation switching leg in the step-up/down converter D1. The third voltage-transformation IGBT 6c and the fourth voltage-transformation IGBT 6d constitute a B-phase voltage-transformation switching leg in the step-up/down converter D1.

In the first voltage-transformation IGBT 6a, the collector terminal is commonly connected to the collector terminal of the third voltage-transformation IGBT 6c and one end of the second capacitor 7, the emitter terminal is commonly connected to the other end of the primary winding 5a and the collector terminal of the second voltage-transformation IGBT 6b, and the gate terminal is connected to a first output terminal for the step-up/down converter D1 in the gate driver 2. The first voltage-transformation IGBT 6a is a semiconductor switching element of which an ON/OFF operation is controlled on the basis of a first voltage-transformation gate signal input from the gate driver 2.

In the second voltage-transformation IGBT 6b, the collector terminal is commonly connected to the other end of the primary winding 5a and the emitter terminal of the first voltage-transformation IGBT 6a, the emitter terminal is commonly connected to the emitter terminal of the fourth voltage-transformation IGBT 6d, the other end of the first capacitor 4, and the other end of the second capacitor 7, and the gate terminal is connected to a second output terminal for the step-up/down converter D1 in the gate driver 2. The second voltage-transformation IGBT 6b is a semiconductor switching element of which an ON/OFF operation is controlled on the basis of a second voltage-transformation gate signal input from the gate driver 2.

In the third voltage-transformation IGBT 6c, the collector terminal is commonly connected to the collector terminal of the first voltage-transformation IGBT 6a and one end of the second capacitor 7, the emitter terminal is commonly connected to the other end of the secondary winding 5b and the collector terminal of the fourth voltage-transformation IGBT 6d, and the gate terminal is connected to a third output terminal for the step-up/down converter D1 in the gate driver 2. The third voltage-transformation IGBT 6c is a semiconductor switching element of which an ON/OFF operation is controlled on the basis of a third voltage-transformation gate signal input from the gate driver 2.

In the fourth voltage-transformation IGBT 6d, the collector terminal is commonly connected to the other end of the secondary winding 5b and the emitter terminal of the third voltage-transformation IGBT 6c, the emitter terminal is commonly connected to the emitter terminal of the second voltage-transformation IGBT 6b, the other end of the first capacitor 4, and the other end of the second capacitor 7, and the gate terminal is connected to a fourth output terminal for the step-up/down converter D1 in the gate driver 2. The fourth voltage-transformation IGBT 6d is a semiconductor switching element of which an ON/OFF operation is controlled on the basis of a fourth voltage-transformation gate signal input from the gate driver 2.

In the second capacitor 7, one end is connected to the collector terminal of the first voltage-transformation IGBT 6a and the collector terminal of the third voltage-transformation IGBT 6c, and the other end is commonly connected to the emitter terminal of the second voltage-transformation IGBT 6b, the emitter terminal of the fourth voltage-transformation IGBT 6d, the other end of the first capacitor 4, and the second DC input/output terminal E2. The two ends of the second capacitor 7 are secondary-side input/output terminals in the step-up/down converter D1.

The second capacitor 7 smooths ripples which may be included in DC electric power (step-up electric power) input from the A-phase voltage-transformation switching leg and the B-phase voltage-transformation switching leg. The second capacitor 7 smooths ripples which may be included in DC electric power (regeneration electric power) input from the driving inverter D2 and DC electric power (charging electric power) input from the power-generation inverter D3.

Although not illustrated in the drawing, a primary-side voltage sensor, a secondary-side voltage sensor, and a reactor current sensor are incidentally provided as detectors for detecting a state quantity indicating an operation state of the step-up/down converter D1 in the step-up/down converter D1. The primary-side voltage sensor is a voltage sensor that detects a primary-side voltage V1 on the primary side, that is, on the battery P side, of the step-up/down converter D1 and outputs the primary-side voltage V1 which is a state quantity of the step-up/down converter D1 to the ECU 3.

The secondary-side voltage sensor is a voltage sensor that detects a secondary-side voltage V2 on the secondary side, that is, on the driving inverter D2 side (on the power-generation inverter D3 side), of the step-up/down converter D1 and outputs the secondary-side voltage V2 which is a state quantity of the step-up/down converter D1 to the ECU 3. The secondary-side voltage V2 is also a primary-side voltage of the driving inverter D2 and a secondary-side voltage of the power-generation inverter D3.

The reactor current sensor is a current sensor that detects a combined current of a primary current flowing in the primary winding 5a of the transformer 5 and a secondary current flowing in the secondary winding 5b as a reactor current I and outputs the reactor current I which is a state quantity of the step-up/down converter D1 to the ECU 3. The reactor current I corresponds to a powering current flowing from the primary side to the secondary side in the step-up/down converter D1 or a regenerating current or a charging current flowing from the secondary side to the primary side.

Out of six driving IGBTs 8a to 8f constituting the driving inverter D2, the first driving IGBT 8a and the second driving IGBT 8b constitute a U-phase driving switching leg, the third driving IGBT 8c and the fourth driving IGBT 8d constitute a V-phase driving switching leg, and the fifth driving IGBT 8e and the sixth driving IGBT 8f constitute a W-phase driving switching leg.

In the first driving IGBT 8a out of the first driving IGBT 8a and the second driving IGBT 8b, the collector terminal is commonly connected to the collector terminal of the third driving IGBT 8c and the collector terminal of the fifth driving IGBT 8e, and the emitter terminal is commonly connected to the collector terminal of the second driving IGBT 8b and the U-phase motor terminal Fu.

In the first driving IGBT 8a, the gate terminal is connected to the first output terminal for the driving inverter D2 in the gate driver 2. The first driving IGBT 8a is a semiconductor switching element of which an ON/OFF operation is controlled on the basis of the first driving gate signal input from the gate driver 2.

In the second driving IGBT 8b, the collector terminal is commonly connected to the emitter terminal of the first driving IGBT 8a and the U-phase motor terminal Fu, and the emitter terminal is commonly connected to the emitter terminal of the fourth driving IGBT 8d and the emitter terminal of the sixth driving IGBT 8f.

In the second driving IGBT 8b, the gate terminal is connected to the second output terminal for the driving inverter D2 in the gate driver 2. The second driving IGBT 8b is a semiconductor switching element of which an ON/OFF operation is controlled on the basis of the second driving gate signal input from the gate driver 2.

In the third driving IGBT 8c, the collector terminal is commonly connected to the collector terminal of the first driving IGBT 8a and the collector terminal of the fifth driving IGBT 8e, and the emitter terminal is commonly connected to the collector terminal of the fourth driving IGBT 8d and the V-phase motor terminal Fv.

In the third driving IGBT 8c, the gate terminal is connected to the second output terminal for the driving inverter D2 in the gate driver 2. The third driving IGBT 8c is a semiconductor switching element of which an ON/OFF operation is controlled on the basis of the third driving gate signal input from the gate driver 2.

In the fourth driving IGBT 8d, the collector terminal is commonly connected to the emitter terminal of the third driving IGBT 8c and the V-phase motor terminal Fv, and the emitter terminal is commonly connected to the emitter terminal of the second driving IGBT 8b and the emitter terminal of the sixth driving IGBT 8f.

In the fourth driving IGBT 8d, the gate terminal is connected to the fourth output terminal for the driving inverter D2 in the gate driver 2. The fourth driving IGBT 8d is a semiconductor switching element of which an ON/OFF operation is controlled on the basis of the fourth driving gate signal input from the gate driver 2.

In the fifth driving IGBT 8e, the collector terminal is commonly connected to the collector terminal of the first driving IGBT 8a and the collector terminal of the third driving IGBT 8c, and the emitter terminal is commonly connected to the collector terminal of the sixth driving IGBT 8f and the W-phase motor terminal Fw.

In the fifth driving IGBT 8e, the gate terminal is connected to the fifth output terminal for the driving inverter D2 in the gate driver 2. The fifth driving IGBT 8e is a semiconductor switching element of which an ON/OFF operation is controlled on the basis of the fifth driving gate signal input from the gate driver 2.

In the sixth driving IGBT 8f, the collector terminal is commonly connected to the emitter terminal of the fifth driving IGBT 8e and the W-phase motor terminal Fw, and the emitter terminal is commonly connected to the emitter terminal of the second driving IGBT 8b and the emitter terminal of the fourth driving IGBT 8d.

In the sixth driving IGBT 8f, the gate terminal is connected to the sixth output terminal for the driving inverter D2 in the gate driver 2. The sixth driving IGBT 8f is a semiconductor switching element of which an ON/OFF operation is controlled on the basis of the sixth driving gate signal input from the gate driver 2.

In the driving inverter D2, two ends of each of three switching legs, that is, the U-phase driving switching leg, the V-phase driving switching leg, and the W-phase driving switching leg, commonly connected to each other, that is, the collector terminal of the first driving IGBT 8a, the collector terminal of the third driving IGBT 8c, and the collector terminal of the fifth driving IGBT 8e and the emitter terminal of the second driving IGBT 8b, the emitter terminal of the fourth driving IGBT 8d, and the emitter terminal of the sixth driving IGBT 8f, are the primary-side input/output terminals of the driving inverter D2. Three midpoints of the U-phase driving switching leg, the V-phase driving switching leg, and the W-phase driving switching leg, that is, a connection point between the emitter terminal of the first driving IGBT 8a and the collector terminal of the second driving IGBT 8b, a connection point between the emitter terminal of the third driving IGBT 8c and the collector terminal of the fourth driving IGBT 8d, and a connection point between the emitter terminal of the fifth driving IGBT 8e and the collector terminal of the sixth driving IGBT 8f, are the secondary-side input/output terminals of the driving inverter D2.

That is, the connection point between the emitter terminal of the first driving IGBT 8a and the collector terminal of the second driving IGBT 8b, the connection point between the emitter terminal of the third driving IGBT 8c and the collector terminal of the fourth driving IGBT 8d, and the connection point between the emitter terminal of the fifth driving IGBT 8e and the collector terminal of the sixth driving IGBT 8f are the secondary-side input/output terminals of the driving inverter D2.

One of the primary-side input/output terminals of the driving inverter D2, that is, the collector terminal of the first driving IGBT 8a, the collector terminal of the third driving IGBT 8c, and the collector terminal of the fifth driving IGBT 8e, are connected to one of the secondary-side input/output terminals of the step-up/down converter D1, that is, one end of the second capacitor 7, the collector terminal of the first voltage-transformation IGBT 6a, and the collector terminal of the third voltage-transformation IGBT 6c.

The other of the primary-side input/output terminals of the driving inverter D2, that is, the emitter terminal of the second driving IGBT 8b, the emitter terminal of the fourth driving IGBT 8d, and the emitter terminal of the sixth driving IGBT 8f, are connected to the other of the secondary-side input/output terminals of the step-up/down converter D1, that is, the other ends of the first and second capacitors 4 and 7, the emitter terminal of the second voltage-transformation IGBT 6b, and the emitter terminal of the fourth voltage-transformation IGBT 6d.

Out of six power-generation IGBTs 9a to 9f constituting the power-generation inverter D3, the first power-generation IGBT 9a and the second power-generation IGBT 9b constitute a U-phase power-generation switching leg, the third power-generation IGBT 9c and the fourth power-generation IGBT 9d constitute a V-phase power-generation switching leg, and the fifth power-generation IGBT 9e and the sixth power-generation IGBT 9f constitute a W-phase power-generation switching leg.

In the first power-generation IGBT 9a out of the first power-generation IGBT 9a and the second power-generation IGBT 9b, the collector terminal is commonly connected to the collector terminal of the third power-generation IGBT 9c and the collector terminal of the fifth power-generation IGBT 9e, and the emitter terminal is commonly connected to the collector terminal of the second power-generation IGBT 9b and the U-phase power-generator terminal Hu.

In the first power-generation IGBT 9a, the gate terminal is connected to the first output terminal for the power-generation inverter D3 in the gate driver 2. The first power-generation IGBT 9a is a semiconductor switching element of which an ON/OFF operation is controlled on the basis of the first power-generation gate signal input from the gate driver 2.

In the second power-generation IGBT 9b, the collector terminal is commonly connected to the emitter terminal of the first power-generation IGBT 9a and the U-phase power-generator terminal Hu, and the emitter terminal is commonly connected to the emitter terminal of the fourth power-generation IGBT 9d and the emitter terminal of the sixth power-generation IGBT 9f.

In the second power-generation IGBT 9b, the gate terminal is connected to the second output terminal for the power-generation inverter D3 in the gate driver 2. The second power-generation IGBT 9b is a semiconductor switching element of which an ON/OFF operation is controlled on the basis of the second power-generation gate signal input from the gate driver 2.

In the third power-generation IGBT 9c, the collector terminal is commonly connected to the collector terminal of the first power-generation IGBT 9a and the collector terminal of the fifth power-generation IGBT 9e, and the emitter terminal is commonly connected to the collector terminal of the fourth power-generation IGBT 9d and the V-phase power-generator terminal Hv.

In the third power-generation IGBT 9c, the gate terminal is connected to the third output terminal for the power-generation inverter D3 in the gate driver 2. The third power-generation IGBT 9c is a semiconductor switching element of which an ON/OFF operation is controlled on the basis of the third power-generation gate signal input from the gate driver 2.

In the fourth power-generation IGBT 9d, the collector terminal is commonly connected to the emitter terminal of the third power-generation IGBT 9c and the V-phase power-generator terminal Hv, and the emitter terminal is commonly connected to the emitter terminal of the second power-generation IGBT 9b and the emitter terminal of the sixth power-generation IGBT 9f.

In the fourth power-generation IGBT 9d, the gate terminal is connected to the fourth output terminal for the power-generation inverter D3 in the gate driver 2. The fourth power-generation IGBT 9d is a semiconductor switching element of which an ON/OFF operation is controlled on the basis of the fourth power-generation gate signal input from the gate driver 2.

In the fifth power-generation IGBT 9e, the collector terminal is commonly connected to the collector terminal of the first power-generation IGBT 9a and the collector terminal of the third power-generation IGBT 9c, and the emitter terminal is commonly connected to the collector terminal of the sixth power-generation IGBT 9f and the W-phase power-generator terminal Hw.

In the fifth power-generation IGBT 9e, the gate terminal is connected to the fifth output terminal for the power-generation inverter D3 in the gate driver 2. The fifth power-generation IGBT 9e is a semiconductor switching element of which an ON/OFF operation is controlled on the basis of the fifth power-generation gate signal input from the gate driver 2.

In the sixth power-generation IGBT 9f, the collector terminal is commonly connected to the emitter terminal of the fifth power-generation IGBT 9e and the W-phase power-generator terminal Hw, and the emitter terminal is commonly connected to the emitter terminal of the second power-generation IGBT 9b and the emitter terminal of the fourth power-generation IGBT 9d.

In the sixth power-generation IGBT 9f, the gate terminal is connected to the sixth output terminal for the power-generation inverter D3 in the gate driver 2. The sixth power-generation IGBT 9f is a semiconductor switching element of which an ON/OFF operation is controlled on the basis of the sixth power-generation gate signal input from the gate driver 2.

In the power-generation inverter D3, three midpoints in the U-phase power-generation switching leg, the V-phase power-generation switching leg, and the W-phase power-generation switching leg, that is, a connection point between the emitter terminal of the first power-generation IGBT 9a and the collector terminal of the second power-generation IGBT 9b, a connection point between the emitter terminal of the third power-generation IGBT 9c and the collector terminal of the fourth power-generation IGBT 9d, and a connection point between the emitter terminal of the fifth power-generation IGBT 9e and the collector terminal of the sixth power-generation IGBT 9f, are the primary-side input/output terminals of the power-generation inverter D3.

Out of three primary-side input/output terminals of the power-generation inverter D3, the midpoint of the U-phase power-generation switching leg is connected to the U-phase power-generator terminal Hu, the midpoint of the V-phase power-generation switching leg is connected to the V-phase power-generator terminal Hv, and the midpoint of the W-phase power-generation switching leg is connected to the W-phase power-generator terminal Hv.

In the power-generation inverter D3, two ends of the U-phase power-generation switching leg, the V-phase power-generation switching leg, and the W-phase power-generation switching leg commonly connected to each other, that is, the collector terminal of the first power-generation IGBT 9a and the collector terminal of the third power-generation IGBT 9c, the collector terminal of the fifth power-generation IGBT 9e and the emitter terminal of the second power-generation IGBT 9b, the emitter terminal of the fourth power-generation IGBT 9d, and the emitter terminal of the sixth power-generation IGBT 9f, are the secondary-side input/output terminals of the power-generation inverter D3.

The secondary-side input/output terminals of the power-generation inverter D3 are commonly connected to the secondary-side input/output terminals of the step-up/down converter D1 and the primary-side input/output terminals of the driving inverter D2 as illustrated in the drawing. That is, the step-up/down converter D1 performs inputting/outputting of DC electric power between the driving inverter D2 and/or the power-generation inverter D3 and the battery P.

The voltage-transformation IGBTs 6a to 6d, the driving IGBTs 8a to 8f, and the power-generation IGBTs 9a to 9f each include a reflux diode as illustrated in the drawing. That is, a cathode terminal of each reflux diode is connected to the collector terminal of the corresponding IGBT, and an anode terminal is connected to the emitter terminal thereof. The reflux diode can allow a reflux current to flow from the anode terminal to the cathode terminal when the IGBT is in the OFF state.

The gate driver 2 is a circuit including the voltage-transformation gate signal generating part 2a, the driving gate signal generating part 2b, and the power-generation gate signal generating part 2c and generating the first to fourth voltage-transformation gate signals, the first to sixth driving gate signals, and the first to sixth power-generation gate signals on the basis of various duty command values (a voltage-transformation duty command value, a driving duty command value, and a power-generation duty command value) input from the ECU 3.

The voltage-transformation gate signal generating part 2a corresponds to the step-up/down converter D1 and generates the first to fourth voltage-transformation gate signals on the basis of the voltage-transformation duty command value input from the ECU 3 and a voltage-transformation carrier frequency. That is, the voltage-transformation gate signal generating part 2a generates pulse width modulation (PWM) signals with a repetition frequency (a repetition period) and a duty ratio corresponding to the voltage-transformation carrier frequency and the voltage-transformation duty command value as the first to fourth voltage-transformation gate signals by comparing the voltage-transformation duty command value with carrier waves (triangular waves) of a period corresponding to the voltage-transformation carrier frequency.

The voltage-transformation gate signal generating part 2a outputs the first voltage-transformation gate signal to the gate terminal of the first voltage-transformation IGBT 6a of the step-up/down converter D1, outputs the second voltage-transformation gate signal to the gate terminal of the second voltage-transformation IGBT 6b of the step-up/down converter D1, outputs the third voltage-transformation gate signal to the third voltage-transformation IGBT 6c of the step-up/down converter D1, and outputs the fourth voltage-transformation gate signal to the fourth voltage-transformation IGBT 6d of the step-up/down converter D1.

The driving gate signal generating part 2b corresponds to the driving inverter D2 and generates the first to sixth driving gate signals on the basis of the driving duty command value input from the ECU 3 and a driving carrier frequency. That is, the driving gate signal generating part 2b generates PWM signals with a repetition frequency (a repetition period) and a duty ratio corresponding to the driving carrier frequency and the driving duty command value as the first to sixth driving gate signals by comparing the driving duty command value with carrier waves (triangular waves) of a period corresponding to the driving carrier frequency.

The driving gate signal generating part 2b outputs the first driving gate signal to the gate terminal of the first driving IGBT 8a of the driving inverter D2, outputs the second driving gate signal to the gate terminal of the second driving IGBT 8b of the driving inverter D2, outputs the third driving gate signal to the gate terminal of the third driving IGBT 8c of the driving inverter D2, outputs the fourth driving gate signal to the gate terminal of the fourth driving IGBT 8d of the driving inverter D2, outputs the fifth driving gate signal to the gate terminal of the fifth driving IGBT 8e of the driving inverter D2, and outputs the sixth driving gate signal to the gate terminal of the sixth driving IGBT 8f of the driving inverter D2.

The power-generation gate signal generating part 2c corresponds to the power-generation inverter D3 and generates the first to sixth power-generation gate signals on the basis of the power-generation duty command value input from the ECU 3 and a power-generation carrier frequency. That is, the power-generation gate signal generating part 2c generates PWM signals with a repetition frequency (a repetition period) and a duty ratio corresponding to the power-generation carrier frequency and the power-generation duty command value as the first to sixth power-generation gate signals by comparing the power-generation duty command value with carrier waves (triangular waves) of a period corresponding to the power-generation carrier frequency.

The power-generation gate signal generating part 2c outputs the first power-generation gate signal to the gate terminal of the first power-generation IGBT 9a of the power-generation inverter D3, outputs the second power-generation gate signal to the gate terminal of the second power-generation IGBT 9b of the power-generation inverter D3, outputs the third power-generation gate signal to the gate terminal of the third power-generation IGBT 9c of the power-generation inverter D3, outputs the fourth power-generation gate signal to the gate terminal of the fourth power-generation IGBT 9d of the power-generation inverter D3, outputs the fifth power-generation gate signal to the gate terminal of the fifth power-generation IGBT 9e of the power-generation inverter D3, and outputs the sixth power-generation gate signal to the gate terminal of the sixth power-generation IGBT 9f of the power-generation inverter D3.

The ECU 3 is a control circuit that performs a predetermined control process on the basis of a control program which is stored in advance. The ECU 3 outputs the duty command values (the voltage-transformation duty command value, the driving duty command value, and the power-generation duty command value) generated in the control process to the gate driver 2.

The ECU 3 performs driving control of the three-phase motor M and charging control of the battery P via the PCU 1 and the gate driver 2. That is, the ECU 3 generates various duty command values for the step-up/down converter D1, the driving inverter D2, and the power-generation inverter D3 (the voltage-transformation duty command value, the driving duty command value, and the power-generation duty command value) on the basis of detection values from voltage sensors (voltage detection values), detection values from current sensors (current detection values) which are incidentally provided in the step-up/down converter D1, the driving inverter D2, and the power-generation inverter D3, operation information of the electric vehicle, and the like.

The ECU 3 causes the gate driver 2 to generate the first to fourth voltage-transformation gate signals, the first to sixth driving gate signals, and the first to sixth power-generation gate signals by supplying the various duty command values (the voltage-transformation duty command value, the driving duty command value, and the power-generation duty command value) to the gate driver 2. The step-up/down converter D1 is controlled on the basis of the first to fourth voltage-transformation gate signals, the driving inverter D2 is controlled on the basis of the first to sixth driving gate signals, and the power-generation inverter D3 is controlled on the basis of the first to sixth power-generation gate signals.

Figure 2:
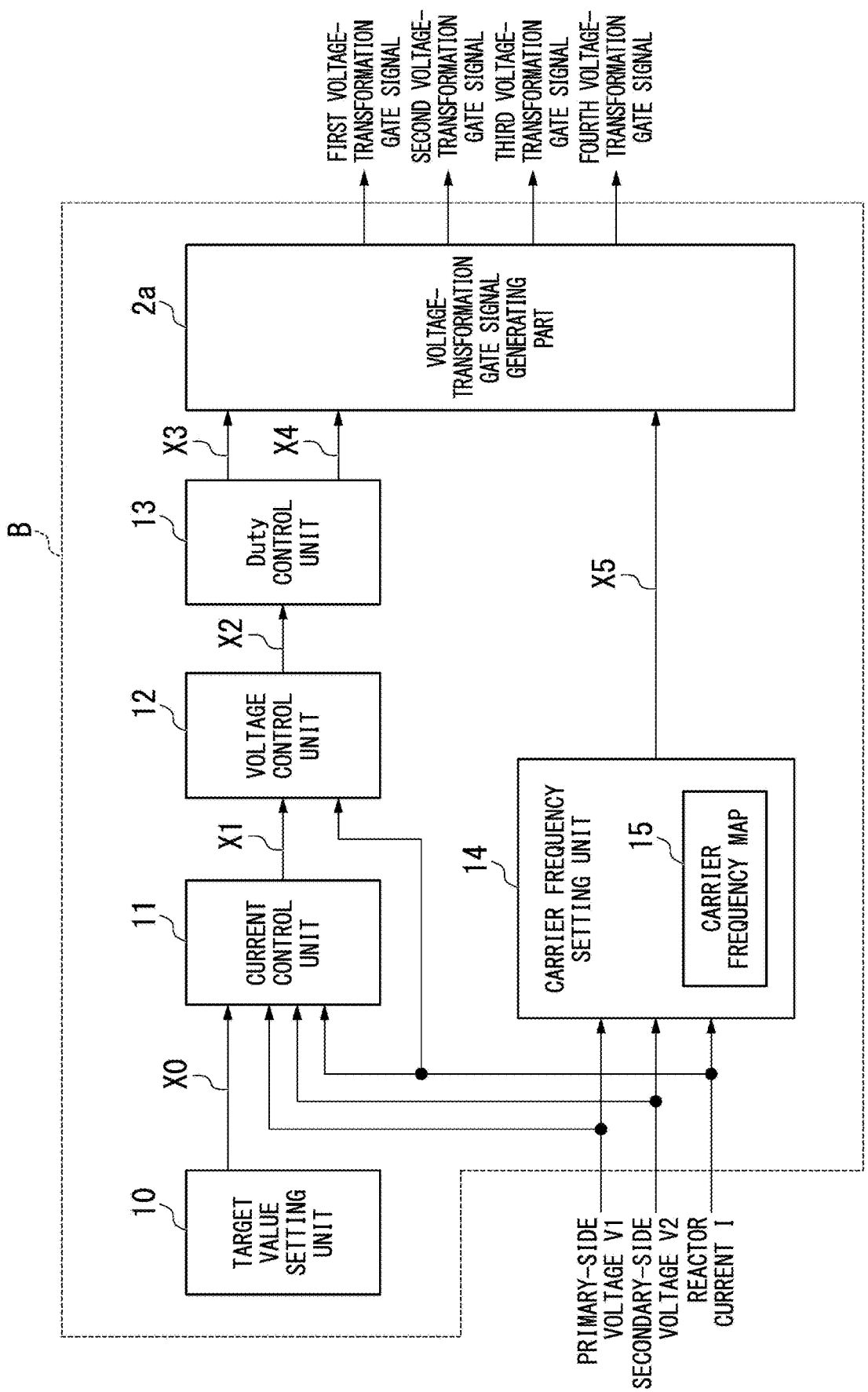
FIG. 2 is a block diagram illustrating a configuration of a voltage-transformation gate signal generating part according to the embodiment of the present invention.

A configuration of a voltage transformation control unit B that controls the step-up/down converter D1 will be described below in detail with reference to FIG. 2.

The voltage transformation control unit B is a control element that is constituted by the voltage-transformation gate signal generating part 2a and some functional elements of the ECU 3 and that is specialized for control of the step-up/down converter D1. As illustrated in FIG. 2, the voltage transformation control unit B includes a target value setting unit 10, a current control unit 11, a voltage control unit 12, a duty control unit 13, a carrier frequency setting unit 14, and a voltage-transformation gate signal generating part 2a.

The target value setting unit 10 is a functional element configured to set a voltage-transformation control target value X0 on the basis of an amount of operation of an electric vehicle. The voltage-transformation control target value X0 is a target value of a step-up ratio at which the step-up/down converter D1 performs a step-up operation or a target value of a step-down ratio at which the step-up/down converter D1 performs a step-down operation. The target value setting unit 10 outputs the voltage-transformation control target value X0 to the current control unit 11. The step-up ratio or the step-down ratio is a ratio between the primary-side voltage V1 and the secondary-side voltage V2.

The current control unit 11 is an arithmetic operation unit configured to calculate a current command value X1 on the basis of the voltage-transformation control target value X0, the primary-side voltage V1 input from the primary-side voltage sensor, the secondary-side voltage V2 input from the secondary-side voltage sensor, and the reactor current I input from the reactor current sensor. The current control unit 11 outputs the current command value X1 to the voltage control unit 12.

The voltage control unit 12 is an arithmetic operation unit configured to calculate a voltage command value X2 on the basis of the current command value X1 and the reactor current I. The voltage control unit 12 outputs the voltage command value X2 to the duty control unit 13. The duty control unit 13 is an arithmetic operation unit configured to calculate duty command values X3 and X4 indicating duty ratios of the first to fourth voltage-transformation gate signals (PWM signals) on the basis of the voltage command value X2.

The step-up/down converter D1 according to this embodiment is a magnetic coupling interleaved chopper circuit including a primary winding 5a and a secondary winding 5b which are magnetically coupled and including an A-phase voltage-transformation switching leg and a B-phase voltage transformation switching leg. The A-phase voltage transformation switching leg and the B-phase voltage transformation switching leg are controlled on the basis of the first and second voltage-transformation gate signals and the third and fourth voltage-transformation gate signals which have a phase relationship (phase) of 180°.

In order to cope with such a step-up/down converter D1, the duty command values X3 and X4 include an A-phase duty command value X3 and a B-phase duty command value X4. That is, the A-phase duty command value X3 is a command value for designating a duty ratio of the first voltage-transformation gate signal and the second voltage-transformation gate signal, and the B-phase duty command value X4 is a command value for designating a duty ratio of the third voltage-transformation gate signal and the fourth voltage-transformation gate signal.

The carrier frequency setting unit 14 is a functional element configured to set a repetition frequency (a carrier frequency fc) of the first to fourth voltage-transformation gate signals on the basis of the primary-side voltage V1, the secondary-side voltage V2, and the reactor current I. The carrier frequency fc is a power-generation carrier frequency corresponding to a frequency of carrier waves (triangular waves) used for the voltage-transformation gate signal generating part 2a to generate the first to fourth voltage-transformation gate signals.

The carrier frequency setting unit 14 is a functional element corresponding to a switching frequency setting unit in the present invention, and the carrier frequency fc is a physical quantity for designating switching frequencies of the first to fourth voltage-transformation IGBTs 6a to 6d constituting the step-up/down converter D1. That is, the carrier frequency setting unit 14 sets the carrier frequency fc of the step-up/down converter D1 (the magnetic coupling interleaved chopper circuit) on the basis of the primary-side voltage V1, the secondary-side voltage V2, and the reactor current I (state quantities) indicating an operation state of the step-up/down converter D1 (the magnetic coupling interleaved chopper circuit).

The carrier frequency setting unit 14 sets a frequency value X5 of the carrier frequency fc by using a carrier frequency map 15 stored in advance in the ECU 3. The carrier frequency map 15 is a two-dimensional table in which the frequency values X5 of the carrier frequency fc corresponding to a plurality of discrete values of the secondary-side voltage V2 and a plurality of discrete values of the reactor current I are registered with respect to the secondary-side voltage V2 and the reactor current I in a predetermined range as illustrated in FIG. 3.

That is, the carrier frequency map 15 is a two-dimensional table when the primary-side voltage V1 is 220 V (volt) as illustrated in FIG. 3, and the frequency values X5 of the carrier frequency fc are registered with respect to a total of 11 points of voltage values in a range of the secondary-side voltage V2 of 220 V to 700 V and a total of 41 points of current values in a range of the reactor current I of −200 A (ampere) to +200 A therein.

In the carrier frequency map 15, the frequency value X5 at which a circuit loss of the step-up/down converter D1 as a whole is minimized is registered with respect to three physical quantities indicating the operation state of the step-up/down converter D1, that is, values of the primary-side voltage V1, the secondary-side voltage V2, and the reactor current I. The polarity of the reactor current I in FIG. 3 is defined as + (plus) when the reactor current I flows from the primary side to the secondary side in the step-up/down converter D1 and is defined as − (minus) when the reactor current I flows from the secondary side to the primary side.

The frequency values X5 in the carrier frequency map 15 are estimated, for example, as values for minimizing the circuit loss of the step-up/down converter D1 as a whole by preliminary experiment associated with performance of the step-up/down converter D1 before the PCU 1 is mounted in an electric vehicle.

For example, the range of the carrier frequency range is determined such that an upper limit of the carrier frequency is a value satisfying thermal requirements of an IGBT, and a lower limit of the carrier frequency is a value satisfying device noise vibration. In this way, a map that provides the frequency value X5 for minimizing the circuit loss of the step-up/down converter D1 as a whole with respect to the values of the primary-side voltage V1, the secondary-side voltage V2, and the reactor current I in the carrier frequency range is prepared. Accordingly, it is possible to set a carrier frequency optimal for the device.

In FIG. 3, the frequency values X5 corresponding to the values of the secondary-side voltage V2 and the reactor current I when the primary-side voltage V1 is 220 V are described as an example, and the carrier frequency fc corresponding to a case in which the secondary-side voltage V2 is 450 V and the reactor current I is −20 A is 12 kHz (kilohertz). That is, when the primary-side voltage V1 is 220 V, the secondary-side voltage V2 is 450 V, and the reactor current I is −20 A, the circuit loss of the step-up/down converter D1 as a whole is minimized under the condition that the frequency value X5 of the carrier frequency fc is set to 12 kHz.

As illustrated in FIG. 3, the frequency value X5 in the carrier frequency map 15 is set to be lower in an operation state, in which the step-up ratio of the step-up/down converter D1 is nearly doubled, that is, the secondary-side voltage V2 is 450 V, than the frequency value X5 before and after the step-up ratio is nearly doubled. That is, the frequency value X5 in the operation state in which the step-up ratio of the step-up/down converter D1 is doubled is set to be lower than the frequency value X5 in the operation state before and after the step-up ratio of the step-up/down converter D1 is doubled. A specific example will be described below with reference to FIG. 3.

For example, when the secondary-side voltage V2 is 450 V and the reactor current I is −30 A, the frequency value X5 is 9 kHz. When the secondary-side voltage V2 is 400 V and the reactor current I is −30 A, the frequency value X5 is 11 kHz. When the secondary-side voltage V2 is 500 V and the reactor current I is −30 A, the frequency value X5 is 12 kHz.

When the secondary-side voltage V2 is 450 V and the reactor current I is 20 A, the frequency value X5 is 11 kHz. When the secondary-side voltage V2 is 400 V and the reactor current I is 20 A, the frequency value X5 is 12 kHz. When the secondary-side voltage V2 is 500 V and the reactor current I is 20 A, the frequency value X5 is 12 kHz.

The step-up/down converter D1 configured as a magnetic coupling interleaved chopper circuit is characterized in that a magnetic flux generated by the reactor current Ia flowing in the primary winding 5a of the transformer 5 and a magnetic flux generated by the reactor current Ib flowing in the secondary winding 5b in the operation state in which the step-up ratio is doubled are cancelled to minimize core loss.

Accordingly, in this embodiment, a switching loss in the A-phase switching leg and the B-phase switching leg, that is, a switching loss of the first to fourth voltage-transformation IGBTs 6a to 6d, in the operation state in which the step-up ratio is doubled is decreased, and this decreases the carrier frequency fc in comparison with another step-up ratio in order to minimize the circuit loss of the step-up/down converter D1 as a whole.

In the carrier frequency map 15, the frequency value X5 of one carrier frequency fc is extracted by designating the value of the primary-side voltage V1, the value of the secondary-side voltage V2, and the value of the reactor current I. That is, the carrier frequency setting unit 14 searches the frequency value X5 of the carrier frequency fc corresponding to the values of the primary-side voltage V1, the secondary-side voltage V2, and the reactor current I input from the outside from the carrier frequency map 15 and outputs the frequency value X5 which is the result of search to the voltage-transformation gate signal generating part 2a.

Here, the target value setting unit 10, the current control unit 11, the voltage control unit 12, and the duty control unit 13 out of the elements of the voltage transformation control unit B are the same as the elements in a known gate signal generation device. That is, the carrier frequency setting unit 14 out of the elements of the voltage transformation control unit B is the most characteristic part of this embodiment.

The voltage transformation control unit B constitutes the voltage transformer according to this embodiment along with the step-up/down converter D1. That is, the voltage transformer according to this embodiment includes a magnetic coupling interleaved chopper circuit (the step-up/down converter D1) and a control unit (the voltage transformation control unit B) controlling the magnetic coupling interleaved chopper circuit.

Figure 4:
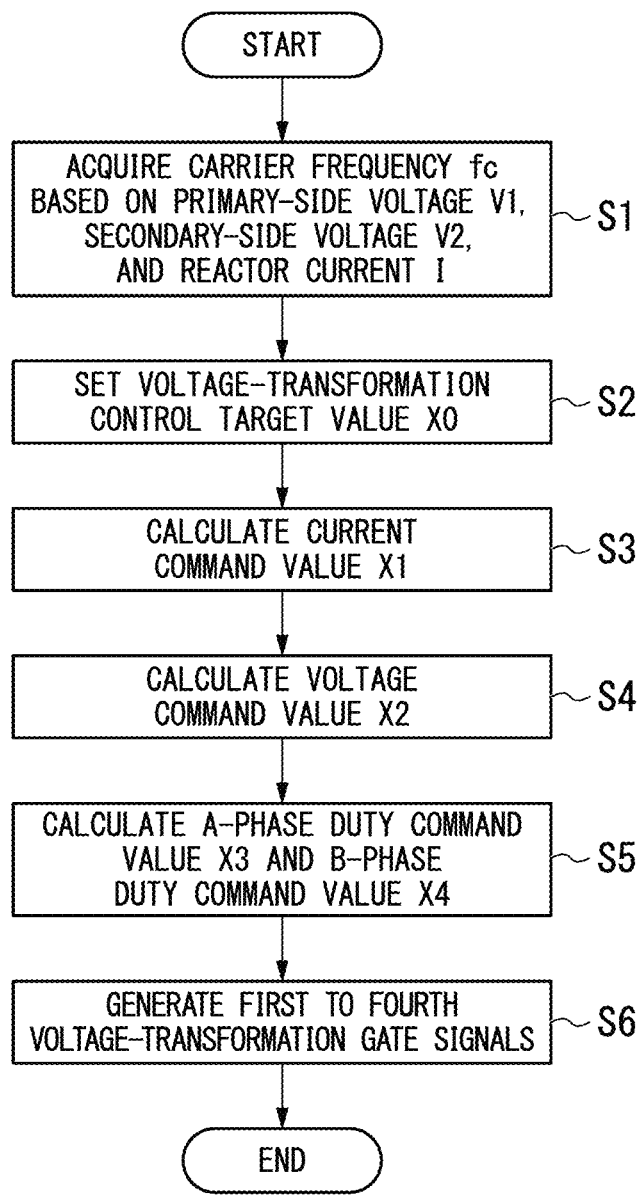
FIG. 4 is a flowchart illustrating an operation which is performed by a voltage transformer according to the embodiment of the present invention.

An operation of a principal part of the control device A according to this embodiment, that is, a control operation of the voltage transformation control unit B, will be described below in detail with reference to FIGS. 4 to 6.

In the voltage transformation control unit B, first, the carrier frequency setting unit 14 acquires frequency values X5 of the carrier frequencies fc corresponding to the values of the primary-side voltage V1, the secondary-side voltage V2, and the reactor current I acquired from the primary-side voltage sensor, the secondary-side voltage sensor, and the reactor current sensor of the step-up/down converter D1 (Step S1).

That is, the carrier frequency setting unit 14 acquires one frequency value X5 by searching the carrier frequency map 15 on the basis of the values of the primary-side voltage V1 and the secondary-side voltage V2 and the value of the reactor current I. Then, the carrier frequency setting unit 14 outputs the frequency value X5 which is the result of search to the voltage-transformation gate signal generating part 2a.

On the other hand, in the voltage transformation control unit B, the target value setting unit 10 sets a voltage-transformation control target value X0 on the basis of an amount of operation of an electric vehicle or the like (Step S2). Then, the target value setting unit 10 outputs the voltage-transformation control target value X0 to the current control unit 11.

Then, the current control unit 11 calculates a current command value X1 on the basis of the values of the primary-side voltage V1 and the secondary-side voltage V2 and the value of the reactor current I in addition to the voltage-transformation control target value X0 (Step S3). Then, the current control unit 11 outputs the current command value X1 to the voltage control unit 12.

Then, the voltage control unit 12 calculates a voltage command value X2 on the basis of the reactor current I in addition to the current command value X1 (Step S4). Then, the voltage control unit 12 outputs the voltage command value X2 to the duty control unit 13.

Then, the duty control unit 13 calculates an A-phase duty command value X3 for the A-phase switching leg and a B-phase duty command value X4 for the B-phase switching leg in the step-up/down converter D1 on the basis of the voltage command value X2 (Step S5). Then, the duty control unit 13 outputs the A-phase duty command value X3 and the B-phase duty command value X4 to the voltage-transformation gate signal generating part 2a.

Then, the voltage-transformation gate signal generating part 2a generates the first to fourth voltage-transformation gate signals on the basis of the A-phase duty command value X3 and the B-phase duty command value X4 (Step S6). Then, the voltage-transformation gate signal generating part 2a outputs the first to fourth voltage-transformation gate signals to the gate terminals of the first to fourth voltage-transformation IGBTs 6a to 6d constituting the step-up/down converter D1. As a result, the step-up/down converter D1 performs voltage transformation at a voltage transformation ratio (a step-up ratio or a step-down ratio) designated by the voltage-transformation control target value X0.

Figure 5:
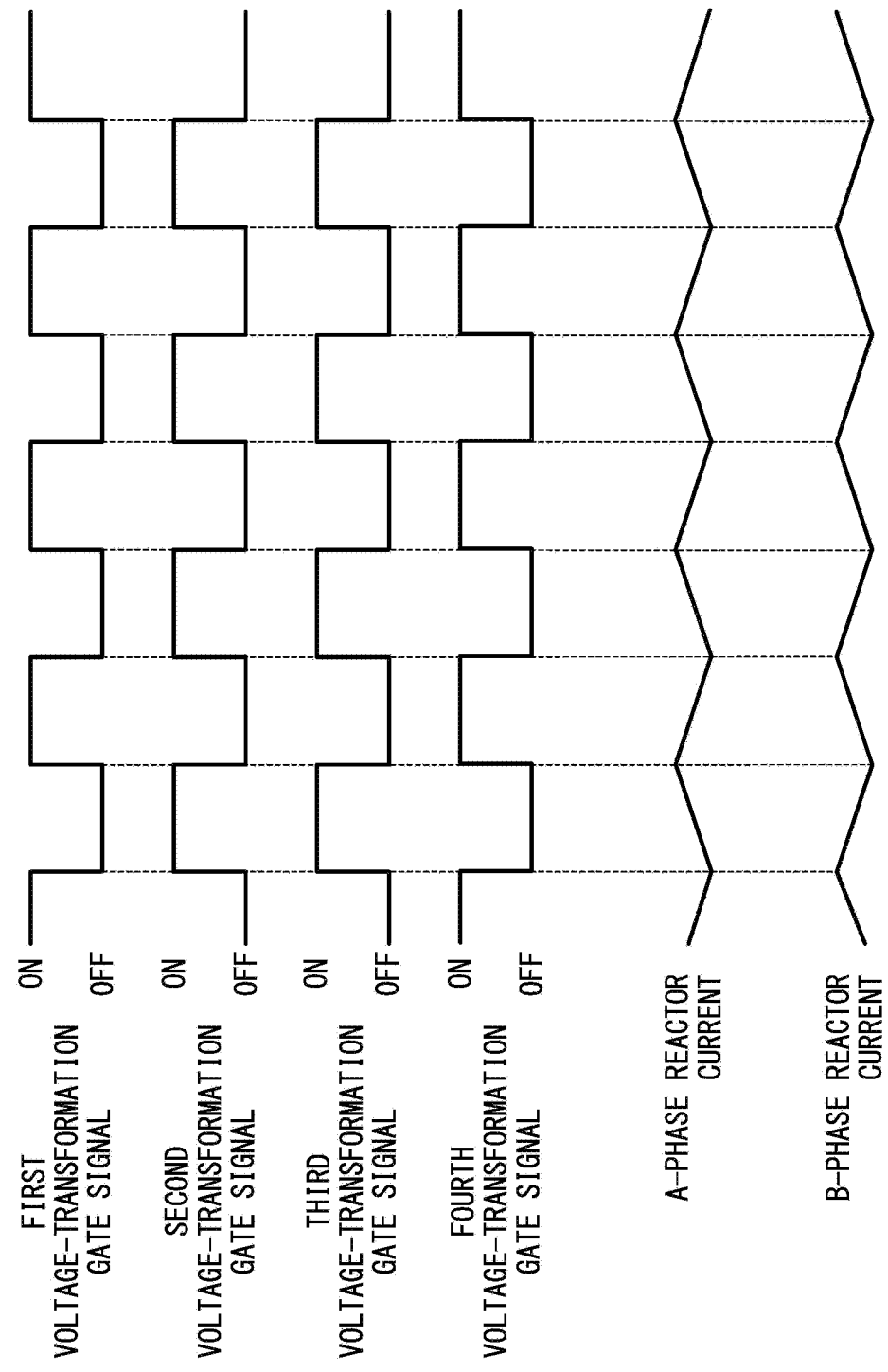
FIG. 5 is a timing chart illustrating operations which are performed by the voltage transformer according to the embodiment of the present invention.

Here, FIG. 5 illustrates an example of the first to fourth voltage-transformation gate signals when the step-up/down converter D1 performs a step-up operation. In the step-up operation, the first and second voltage-transformation gate signals are pulse signals in which a high potential and a low potential are repeated in a predetermined period such that the first and second voltage-transformation IGBTs 6a and 6b are turned on/off in synchronization, and the third and fourth voltage-transformation gate signals are pulse signals as inverted signals of the first and second voltage-transformation gate signals in which a high potential and a low potential are repeated in a predetermined period such that the third and fourth voltage-transformation IGBTs 6c and 6d are turned on/off in synchronization.

The first and second voltage-transformation gate signals controlling the first and second voltage-transformation IGBTs 6a and 6b constituting the A-phase switching leg has a phase relationship with a phase different by 180° from the phase of the third and fourth voltage-transformation gate signals controlling the third and fourth voltage-transformation IGBTs 6c and 6d constituting the B-phase switching leg. As a result, the reactor current of the primary winding 5a connected to the A-phase switching leg (an A-phase reactor current Ia) and the reactor current of the secondary winding 5b connected to the B-phase switching leg (a B-phase reactor current Ib) have a relationship with ripple currents of which the phases are different by 180°.

The A-phase reactor current Ia flows in the second capacitor 7 via the reflux diode provided in the first voltage-transformation IGBT 6a, and the B-phase reactor current Ib flows in the second capacitor 7 via the reflux diode provided in the third voltage-transformation IGBT 6c. That is, a combined current of the A-phase reactor current Ia and the B-phase reactor current Ib flows in the second capacitor 7, and the amplitude of the combined current is very small because the A-phase reactor current Ia and the B-phase reactor current Ib have a phase relationship with phases different by 180°.

With the step-up/down converter D1, that is, the magnetic coupling interleaved chopper circuit including two phases of an A phase and a B phase, it is possible to greatly reduce output current ripples in comparison with a general chopper circuit with a single-phase configuration.

According to this embodiment, since the repetition frequency (the repetition period) of the first to fourth voltage-transformation gate signals is set to minimize the circuit loss of the step-up/down converter D1 as a whole on the basis of the values of the primary-side voltage V1 and the secondary-side voltage V2 and the value of the reactor current I, the whole circuit loss in the whole operation range (the whole voltage-transformation ratio) of the step-up/down converter D1 is minimized.

Accordingly, according to this embodiment, it is possible to reliably improve the circuit loss which is one performance of the step-up/down converter D1 according to the values of the primary-side voltage V1, the secondary-side voltage V2, and the reactor current I indicating the operation state of the step-up/down converter D1.

According to this embodiment, the carrier frequency fc (switching frequency) in the operation state in which the step-up ratio of the step-up/down converter D1 (the magnetic coupling interleaved chopper circuit) is doubled is set to be lower than the carrier frequency fc (switching frequency) before and after the step-up ratio is doubled. According to this embodiment, it is possible to reduce the switching loss of the first to fourth voltage-transformation IGBTs 6a to 6d in addition to an inductance loss in the transformer 5.

According to this embodiment, the carrier frequency map 15 (frequency map) in which a plurality of frequency values based on the values of the primary-side voltage V1, the secondary-side voltage V2, and the reactor current I which are state quantities are registered as the carrier frequency fc (switching frequency) is provided, and the first to fourth voltage-transformation gate signals are generated by searching the carrier frequency map 15 on the basis of the state quantities.

According to this embodiment, it is possible to acquire the carrier frequency fc based on the values of the primary-side voltage V1, the secondary-side voltage V2, and the reactor current I (state quantities) in a relatively short amount of time. As a result, it is possible to generate the first to fourth voltage-transformation gate signals in a relatively short amount of time.

The present invention is not limited to the embodiment, and, for example, the following modified examples can be considered.

(1) In the embodiment, the step-up/down converter D1, that is, the magnetic coupling interleaved chopper circuit with a two-phase configuration of an A phase and a B phase, has been described, but the present invention is not limited thereto. That is, the present invention can also be applied to a magnetic coupling interleaved chopper circuit with a configuration of three or more phases.

(2) In the embodiment, the carrier frequency fc is set on the basis of the carrier frequency map 15, but the present invention is not limited thereto. For example, when the reactor current I has an abnormal value, the carrier frequency fc (switching frequency) may be increased in an emergency evacuation manner as illustrated in FIG. 6.

Figure 6:
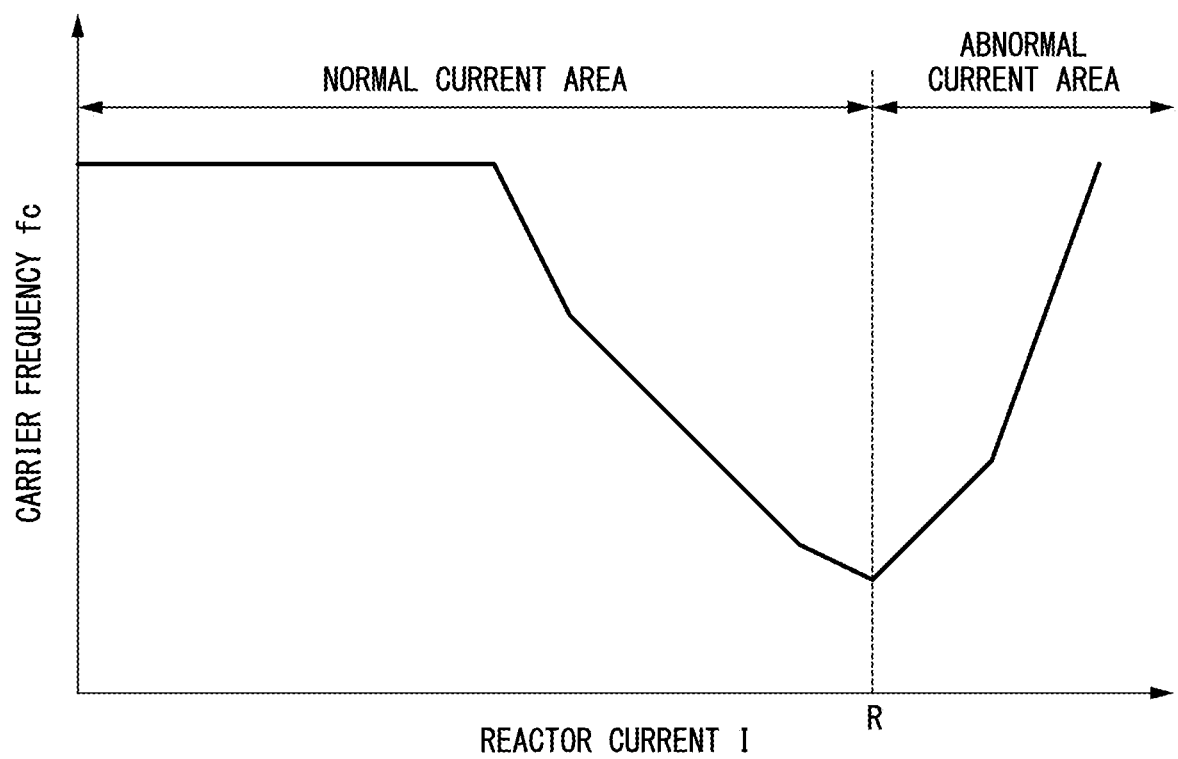
FIG. 6 is a characteristic diagram illustrating a relationship between circuit efficiency of a step-up/down converter and a switching frequency according to the embodiment of the present invention.

In FIG. 6, a state in which the reactor current I exceeds a current threshold value R in a state in which the voltage transformation control unit B sequentially decreases the carrier frequency fc with an increase of the reactor current I is illustrated. The current threshold value R is stored as control data in the voltage transformation control unit B in advance and is a current value for distinguishing a normal current area and an abnormal current area of the step-up/down converter D1.

In this way, when the operation state of the step-up/down converter D1 transitions from the normal current area to the abnormal current area, there is a likelihood that the first to fourth voltage-transformation IGBTs 6a to 6d will be damaged due to an abnormal current, but a peak current of the reactor current I can be curbed to be low by increasing the carrier frequency fc.

According to this modified example, since switching loads of the first to fourth voltage-transformation IGBTs 6a to 6d can be reduced, it is possible to effectively avoid damage of the first to fourth voltage-transformation IGBTs 6a to 6d due to an abnormal current. The abnormal current can be generated when the electric vehicle slips or the like.

(3) In the embodiment, the carrier frequency fc is set using the carrier frequency map 15, but the present invention is not limited thereto. For example, the frequency value X5 of the carrier frequency fc may be acquired by setting a function on the basis of frequency values acquired through preliminary experiments and substituting the state quantities into the function.

(4) In the embodiment, the carrier frequency map 15 having a logical configuration illustrated in FIG. 3 has been employed, but the present invention is not limited thereto. For example, ranges of the physical quantities (for example, the ranges of the primary-side voltage V1, the secondary-side voltage V2, and the reactor current I) in the carrier frequency map 15 can be appropriately set on the basis of the operation range of the step-up/down converter D1 (the magnetic coupling interleaved chopper circuit). Accordingly, the ranges of the physical quantities are not limited to those illustrated in FIG. 3.

The carrier frequency map 15 illustrated in FIG. 3 is associated with the case in which the primary-side voltage V1 is 220 V, but the primary-side voltage V1 is not limited to 220 V. That is, the primary-side voltage V1 is defined by the output voltage of the battery P and thus can be appropriately set according to the output voltage of the battery P.

(5) In the embodiment, the PCU 1 using IGBTs as semiconductor switching elements has been described, but the present invention is not limited thereto. For example, MOSFETs may be employed as the semiconductor switching elements.

INDUSTRIAL APPLICABILITY

According to the present invention, it is possible to provide a voltage transformer that can more reliably improve performance of a magnetic coupling interleaved chopper circuit according to an operation state.

REFERENCE SIGNS LIST

A Control device
B Voltage transformation control unit
D1 Step-up/down converter (magnetic coupling interleaved chopper circuit)
D2 Driving inverter
D3 Power-generation inverter
E1, E2 Battery terminal
Fu, Fv, Fw Motor terminal
G Power generator
Hu, Hv, Hw Power-generator terminal
P Battery
M Three-phase motor (electric motor)
1 PCU (power control unit)
2 Gate driver
2a Voltage-transformation gate signal generating part
2b Driving gate signal generating part
2c Power-generation gate signal generating part
3 ECU
4 First capacitor
5 Transformer
5a Primary winding
5b Secondary winding
6a to 6d Voltage-transformation IGBT
7 Second capacitor
8a to 8f Driving IGBT
9a to 9f Power-generation IGBT
10 Target value setting unit
11 Current control unit
12 Voltage control unit
13 Duty control unit
14 Carrier frequency setting unit (switching frequency setting unit)
15 Carrier frequency map (frequency map)

The invention claimed is:

1. A voltage transformer comprising:
a magnetic coupling interleaved chopper circuit; and
a control unit configured to control the magnetic coupling interleaved chopper circuit,
wherein the control unit includes a switching frequency setting unit configured to set a switching frequency of the magnetic coupling interleaved chopper circuit on the basis of a state quantity indicating an operation state of the magnetic coupling interleaved chopper circuit and is configured to generate a voltage-transformation gate signal of the switching frequency set by the switching frequency setting unit and to output the generated voltage-transformation gate signal to the magnetic coupling interleaved chopper circuit.

2. The voltage transformer according to claim 1, wherein the switching frequency setting unit sets the switching frequency such that a circuit loss of the magnetic coupling interleaved chopper circuit is minimized.

3. The voltage transformer according to claim 2, wherein the switching frequency setting unit sets the switching frequency in the operation state in which a step-up ratio of the magnetic coupling interleaved chopper circuit is doubled to be lower than the switching frequency in the operation state before or after the step-up ratio of the magnetic coupling interleaved chopper circuit is doubled.

4. The voltage transformer according to claim 3, wherein the state quantity includes a reactor current flowing in the magnetic coupling interleaved chopper circuit, and
wherein the switching frequency setting unit increases the switching frequency when the reactor current has an abnormal value.

5. The voltage transformer according to claim 4, wherein the switching frequency setting unit includes a frequency map in which a plurality of frequency values corresponding to the state quantity are registered as the switching frequency and generates the voltage-transformation gate signal by searching the frequency map on the basis of the state quantity.

6. The voltage transformer according to claim 3, wherein the switching frequency setting unit includes a frequency map in which a plurality of frequency values corresponding to the state quantity are registered as the switching frequency and generates the voltage-transformation gate signal by searching the frequency map on the basis of the state quantity.

7. The voltage transformer according to claim 2, wherein the state quantity includes a reactor current flowing in the magnetic coupling interleaved chopper circuit, and
wherein the switching frequency setting unit increases the switching frequency when the reactor current has an abnormal value.

8. The voltage transformer according to claim 7, wherein the switching frequency setting unit includes a frequency map in which a plurality of frequency values corresponding to the state quantity are registered as the switching frequency and generates the voltage-transformation gate signal by searching the frequency map on the basis of the state quantity.

9. The voltage transformer according to claim 2, wherein the switching frequency setting unit includes a frequency map in which a plurality of frequency values corresponding to the state quantity are registered as the switching frequency and generates the voltage-transformation gate signal by searching the frequency map on the basis of the state quantity.

10. The voltage transformer according to claim 1, wherein the switching frequency setting unit includes a frequency map in which a plurality of frequency values corresponding to the state quantity are registered as the switching frequency and generates the voltage-transformation gate signal by searching the frequency map on the basis of the state quantity.

* * * * *